(12) United States Patent
Rich (10) Patent No.: US 11,122,732 B2
(45) Date of Patent: Sep. 21, 2021

(54) FERTILIZER DISTRIBUTION METERING SYSTEM AND METHOD

(71) Applicant: THE TORO COMPANY, Bloomington, MN (US)

(72) Inventor: Thomas M. Rich, Lebanon, IN (US)

(73) Assignee: THE TORO COMPANY, Bloomington, MN (US)

( * ) Notice: Subject to any disclaimer, the term of this patent is extended or adjusted under 35 U.S.C. 154(b) by 223 days.

(21) Appl. No.: 16/408,079

(22) Filed: May 9, 2019

(65) Prior Publication Data

US 2020/0120861 A1    Apr. 23, 2020

Related U.S. Application Data (60) Provisional application No. 62/746,916, filed on Oct. 17, 2018.

(51) Int. Cl.

| A01C 17/00 | (2006.01) |
|---|---|
| B05B 12/00 | (2018.01) |
| A01C 23/00 | (2006.01) |
| A01C 15/00 | (2006.01) |
| A01C 15/06 | (2006.01) |
| A01C 23/04 | (2006.01) |
| A01C 19/02 | (2006.01) |
| A01C 21/00 | (2006.01) |

(Continued)

(52) U.S. Cl.
CPC .......... *A01C 17/008* (2013.01); *A01C 15/005* (2013.01); *A01C 15/06* (2013.01); *A01C 17/001* (2013.01); *A01C 17/005* (2013.01); *A01C 19/02* (2013.01); *A01C 21/00* (2013.01); *A01C 21/005* (2013.01); *A01C 23/007* (2013.01); *A01C 23/047* (2013.01); *B05B 9/06* (2013.01); *B05B 12/00* (2013.01); *B05B 12/081* (2013.01)

(58) Field of Classification Search
CPC ... A01C 17/008; A01C 17/001; A01C 17/005; A01C 15/005; A01C 15/06; A01C 19/02; A01C 21/00; A01C 21/005; A01C 23/007; A01C 23/047; B05B 9/06; B05B 12/00; B05B 12/081
USPC ......... 239/69, 155, 157, 159, 172, 304, 305, 239/550, 551, 650, 661, 662, 663, 681, 239/684, 687
See application file for complete search history.

(56) References Cited

U.S. PATENT DOCUMENTS

| 2,745,503 A | 5/1956 | Fisher |
| 3,485,314 A | 12/1969 | Herr |
| 3,488,061 A | 1/1970 | Hansen |

(Continued)

OTHER PUBLICATIONS

Kasco Manufacturing Co., Inc., "Landscapers Choice Primary Seeder". Retrieved from the Internet at: <URL: https://kascomfg.com/drillsseeders/landscapers-choice-primary-seeder> (2018).

*Primary Examiner* — Steven J Ganey
(74) *Attorney, Agent, or Firm* — Marshall, Gerstein & Borun LLP (57) ABSTRACT

A metering system and method of operating fertilizer distribution equipment, such as a spreader-sprayer, is described that includes monitoring revolution data for opposing left and right wheels with left and right sensors. A controller controls an actuator's operation to operably regulate the output of a liquid and/or solid fertilizer product. The fertilizer output is based at least in part on the revolution data and a fertilizer unit-per-area input.

19 Claims, 6 Drawing Sheets

(51) Int. Cl.
  *B05B 9/06*    (2006.01)
  *B05B 12/08*   (2006.01)

(56) References Cited

U.S. PATENT DOCUMENTS

| | | | |
|---|---|---|---|
| 3,707,305 | A | 12/1972 | de Kinkelder |
| 3,792,814 | A | 2/1974 | Platz |
| 4,023,020 | A | 5/1977 | Lestradet |
| 4,220,998 | A | 9/1980 | Kays |
| 4,230,280 | A | 10/1980 | Leigh et al. |
| 4,277,022 | A | 7/1981 | Holdsworth et al. |
| 4,301,944 | A | 11/1981 | Lestradet |
| 4,350,293 | A | 9/1982 | Lestradet |
| 4,392,611 | A | 7/1983 | Bachman et al. |
| 4,530,463 | A | 7/1985 | Hiniker et al. |
| 4,637,547 | A | 1/1987 | Hiniker et al. |
| 4,721,245 | A | 1/1988 | van Zweeden |
| 4,725,004 | A | 2/1988 | Baran, Jr. |
| 5,052,627 | A | 10/1991 | Balmer |
| 5,190,218 | A | 3/1993 | Kayser et al. |
| 5,333,795 | A * | 8/1994 | Jessen ............... A01C 15/02 239/157 |
| 5,562,172 | A | 10/1996 | Mick |
| 5,574,657 | A | 11/1996 | Tofte et al. |
| 5,642,677 | A | 7/1997 | Meyer |
| 5,655,615 | A | 8/1997 | Mick |
| 5,860,604 | A * | 1/1999 | Kooiker ............... A01C 17/00 239/684 |
| 5,884,205 | A | 3/1999 | Elmore et al. |
| 5,911,362 | A | 6/1999 | Wood et al. |
| 6,009,354 | A | 12/1999 | Flamme et al. |
| 6,091,997 | A | 7/2000 | Flamme et al. |
| 6,145,455 | A | 11/2000 | Gust et al. |
| 6,170,704 | B1 | 1/2001 | Nystrom |
| 6,336,600 | B1 * | 1/2002 | Jessen ............... A01C 7/06 239/155 |
| 6,339,917 | B1 | 1/2002 | Dillon et al. |
| 6,454,294 | B1 | 9/2002 | Bittner et al. |
| 6,606,542 | B2 | 8/2003 | Hauwiller et al. |
| 6,749,128 | B1 * | 6/2004 | Oosterman ......... A01C 23/047 239/155 |
| 6,752,328 | B2 | 6/2004 | Sauls |
| 6,905,077 | B2 | 6/2005 | Hoyle |
| 6,969,010 | B1 | 11/2005 | Kriegshauser |
| 7,073,734 | B2 | 7/2006 | Dorendorf et al. |
| 7,178,824 | B2 | 2/2007 | Ziech |
| 7,413,132 | B1 | 8/2008 | Bogart et al. |
| 7,562,727 | B1 | 7/2009 | Hoffart |
| 8,056,828 | B1 * | 11/2011 | Kline ................ A01C 17/005 239/172 |
| 8,191,795 | B2 * | 6/2012 | Grimm .............. A01M 7/0089 239/1 |
| 8,261,845 | B2 | 9/2012 | Palen |
| D673,586 | S | 1/2013 | Truan et al. |
| 8,352,130 | B2 | 1/2013 | Mitchell |
| 8,649,942 | B2 | 2/2014 | Mitchell |
| 8,857,745 | B2 * | 10/2014 | Aral .................. A01C 15/122 239/681 |
| 9,370,175 | B2 | 6/2016 | Swinney, II et al. |
| 9,623,903 | B2 | 4/2017 | Cook et al. |
| 9,828,047 | B2 | 11/2017 | Eavenson, Sr. et al. |
| 9,884,662 | B2 | 2/2018 | Eavenson, Sr. et al. |
| 2003/0140610 | A1 | 7/2003 | Boyko |
| 2007/0084946 | A1 * | 4/2007 | Neville ............... A01C 23/047 239/172 |
| 2009/0025794 | A1 | 1/2009 | Dorendorf et al. |
| 2010/0003872 | A1 | 1/2010 | Jessen |
| 2015/0367357 | A1 | 12/2015 | Humpal et al. |
| 2016/0122957 | A1 | 5/2016 | Schattinger et al. |
| 2018/0338413 | A1 | 11/2018 | Connell et al. |

* cited by examiner

FERTILIZER DISTRIBUTION METERING SYSTEM AND METHOD

CROSS-REFERENCE TO RELATED APPLICATION

This application claims the benefit of U.S. Provisional Application No. 62/746,916, filed Oct. 17, 2018, which is hereby incorporated by reference herein in its entirety.

FIELD OF THE DISCLOSURE

The present disclosure generally relates to outdoor power equipment and, more particularly, to fertilizer dispensing equipment.

BACKGROUND

Spreader-sprayer machines are used to distribute various types of materials on the ground. Applications for dispensing various materials include ice removal, agriculture, and lawn care in various settings, such as for athletic fields, golf courses, and commercial or residential properties.

The material to be distributed, referred to as a "fertilizer" herein, may be in granular or liquid form, and includes fertilizers, weed killers, insecticides, deicing material, herbicides, cleaners, seeds, etc. When "fertilizer" is used in this document, the term is meant to include the wide variety of possible materials, applications, and settings. The spreader-sprayer machines' widths are often in the range of three to twenty five feet and the spreader-sprayer machine may have zero-turn capabilities.

Depending on the setting, a proper fertilization program can help improve and maintain the quality of turf and can increase agricultural yields. While fertilizer can be dispensed by hand or with walking equipment, rideable equipment can vastly decrease the time needed to apply fertilizer to a given area. Unfortunately, variations in speed while dispensing can result in the fertilizer being distributed unevenly, which can lead to waste and over-fertilization in some areas and under fertilization in other areas. More specifically, rideable equipment or spreader-sprayer machines can typically be calibrated to a certain speed. As such, operation of the rideable equipment below the calibrated speed can result in over fertilization of the area, while operation of the rideable equipment above the calibrated speed can result in under-fertilization of the area. Uneven fertilizer distribution, and the use of relatively slow equipment, may increase costs and harm the soil or area being treated. Uniform distribution of fertilizer, and relatively high speed equipment for higher productivity, are therefore desirable.

SUMMARY

According to a first aspect, fertilizer distribution equipment is described herein that includes a chassis, a motor carried by the chassis and wheels operably coupled to the motor to drive movement of the chassis. The wheels include opposing left and right wheels and the equipment includes left and right sensors that are operably coupled to the left and right wheels respectively, where the left and right sensors are configured to measure revolution data of the left and right wheels. The equipment also includes a hopper carried by the chassis, where the hopper has an outlet configured to receive a solid, flowable fertilizer product; a gate movable to extend across the outlet of the hopper to restrict and stop flow of solid, flowable fertilizer product therethrough; and an actuator coupled to the gate. A "weight-per-area" user input is configured to correspond to distribution of the solid, flowable fertilizer. A controller of the equipment is in communication with the left and right sensors to receive the revolution data therefrom and the weight-per-area user input. The controller is operably coupled to the actuator to control and shift the gate's position with respect to the outlet opening of the hopper based at least in part on the wheel revolution data and the weight-per-area input.

According to some forms, the left and right wheels can be independently steerable and the controller can be configured to average the revolution data from the left and right sensors to determine an equipment speed estimate. Accordingly to further forms, the equipment can include one or more of the following aspects. The equipment can include an impeller that is mounted adjacent to the outlet of the hopper and a motor that is operably coupled to the impeller to drive rotation thereof. The controller is operably coupled to the motor to control operation thereof to regulate the impeller's rotational speed. The equipment can include one or more tanks that are carried by the chassis and are configured to contain a liquid fertilizer product. The equipment also includes a plurality of sprayers, flowpaths that fluidly couple the one or more tanks with the plurality of sprayers, and a plurality of sprayer actuators. Each of the plurality of sprayer actuators is operably coupled to one of the plurality of sprayers to regulate outlets of the plurality of sprayers. The user input can be configured in volume-per-area form to facilitate the distribution of the liquid fertilizer, and the controller can be operably coupled to the plurality of actuators to control their operation. In the event that the revolution data from the left and right sensors indicates that the equipment is changing directions or entering a turn, and based at least in part on the speed estimate and the volume-per-area input, the system appropriately operates the plurality of actuators. The actuators operate such that flow of the liquid fertilizer product through the plurality of sprayers increases from an innermost sprayer of the plurality of sprayers in the direction of the turn to an outermost sprayer of the plurality of sprayers.

In some versions, the equipment's user input can be configured to receive a volume-per-area input for the distribution of the liquid fertilizer and can be operably coupled to the plurality of sprayer actuators to control operation thereof. This system regulates the flow of the liquid fertilizer through the plurality of sprayers based at least in part on the revolution data and the volume-per-area input.

In accordance with a second aspect, fertilizer distribution equipment includes a chassis, a motor carried by the chassis, and wheels operably coupled to the motor to drive movement of the chassis. The wheels include opposing left and right wheels, and the equipment includes left and right sensors that are operably coupled to the left and right wheels respectively. The left and right sensors are configured to measure revolution data of the left and right wheels. The equipment further includes one or more liquid fertilizer tanks to be carried by the chassis, a plurality of sprayers, flowpaths that fluidly couple the one or more tanks with the plurality of sprayers, a plurality of actuators, where each actuator is operably coupled to one of the plurality of sprayers and is configured to regulate an output of the sprayer. The system responds to user input that reflects a volume-per-area input for the distribution of the liquid fertilizer. A controller of the equipment is in communication with the left and right sensors to receive the revolution data therefrom and the user "volume-per-area" input. The controller is operably coupled to the plurality of sprayer actuators to control operation thereof and to regulate the flow of the liquid fertilizer through the plurality of sprayers based at least in part on the revolution data and the user's volume-per-area input.

According to some forms, in response to the revolution data from the left and right sensors that indicates a turn, the controller selectively controls operation of the plurality of sprayer actuators such that flow of the liquid fertilizer through the plurality of sprayers increases from an innermost sprayer in the direction of the turn to an outermost sprayer of the plurality of sprayers.

According to additional forms, the left and right wheels can be independently steerable, and the controller can be configured to average the revolution data from the left and right sensors to estimate the average equipment speed. The equipment can include a hopper that is carried by the chassis and has an outlet, where the hopper is configured to receive a solid, flowable fertilizer product, a gate that is movable to extend across the hopper's outlet to restrict and stop flow of the fertilizer product therethrough, and an actuator that is coupled to the gate. The user input can be configured to receive a weight-per-area input for the distribution of the solid, flowable fertilizer, and the controller can be configured to receive the weight-per-area input. The controller can be operably coupled to the actuator to control its operation and to shift the gate position with respect to the hopper's outlet opening based at least in part on the speed estimate and the weight-per-area input. According to yet a further form, the equipment can further include an impeller that is mounted adjacent to the hopper's outlet and a motor operably coupled to the impeller to drive its rotation. The controller can be operably coupled to the motor to control operation thereof to regulate the impeller's rotational speed.

In accordance with a third aspect, a method of distributing fertilizer using unique fertilizer distribution equipment is described herein. The method includes receiving a unit-per-area input from the user for the distribution of the fertilizer product at a controller, and receiving revolution data from left and right sensors coupled to the equipment's opposing left and right wheels at the controller. With this method, the equipment's left and right wheels are independently steerable, and the revolution data from the left and right sensors is averaged to estimate a speed for the fertilizer distribution equipment. The method also includes controlling the operation of an actuator that is operably coupled to an outlet to regulate output of the fertilizer product based at least in part on the speed estimate and the unit-per-area input.

According to some versions, the fertilizer product can be in solid and flowable form. Further, the fertilizer distribution equipment can include a hopper with an outlet that is configured to receive the solid, flowable fertilizer product and a gate movable to extend across the hopper's outlet to restrict and stop flow of the fertilizer product. The actuator can be coupled to the gate, and the unit-per-area input can be in the form of a weight-per-area input. Additionally, controlling the operation of the actuator can include shifting the gate with respect to the hopper's outlet opening based at least in part on the speed and the weight-per-area input. Alternatively, the method can include controlling the operation of a motor operably coupled to an impeller mounted adjacent to the hopper's outlet with the controller regulating the impeller's rotational speed.

In other versions, the fertilizer product can be in the form of a liquid. Further, the fertilizer distribution equipment can include one or more tanks that contain the liquid fertilizer product, a plurality of sprayers, and flowpaths fluidly coupling the one or more tanks with the plurality of sprayers. The actuator may comprise a plurality of sprayer actuators that are operably coupled to a corresponding one of the plurality of sprayers, with the actuators regulating the outlets of the plurality of sprayers according to the unit-per-area input in the form of a volume-per-area input. Additionally, controlling the actuator's operation can include controlling the operation of the plurality of sprayer actuators to regulate the flow of the liquid fertilizer through the plurality of sprayers based at least in part on the equipment speed and the volume-per-area input.

According to some forms, the method can further include a step of determining that the revolution data indicates that the fertilizer distribution equipment is turning. The method can also include the step of controlling the operation of the actuator to regulate output of the fertilizer product to compensate for the turn. According to further forms, controlling the operation of the actuator can include, in response to determining that the revolution data indicates a turn and based at least in part on the speed and a volume-per-area input, selectively controlling operation of a plurality of sprayer actuators such that flow of the liquid fertilizer through a plurality of sprayers increases from an innermost sprayer in the direction of the turn to an outermost sprayer of the plurality of sprayers.

BRIEF DESCRIPTION OF THE DRAWINGS

The above needs are at least partially met through provision of the embodiments described in the following detailed description, particularly when studied in conjunction with the drawings, wherein.

DETAILED DESCRIPTION

A metering system and method are described herein that advantageously utilize speed and a desired distribution input to control the output of a fertilizer product. Equipment speed can be determined by one or more sensors. In some examples, the sensors can be coupled to wheels of the equipment or components thereof. The system and method can be utilized to dispense solid flowable and/or liquid fertilizer products. Pursuant to this, the desired distribution can be entered by a user in a suitable format, such as weight-per-area or volume-per-area. The systems and methods described herein advantageously and automatically control the output of the fertilizer product to minimize under- and over-fertilization. This leads to less waste and potential impact on the environment associated with over-fertilization. In some examples, operation of the systems and methods described herein can save between 10 and 20 percent of fertilizer as compared fertilizer spreading/spraying with conventional rideable equipment.

An example spreader-sprayer 10 is shown in FIGS. 1-6. The spreader-sprayer 10 includes a chassis 12 supporting an engine or motor 14, wheels 16. A drive linkage operably couples the motor 14 to two or more of drive wheels 16a to drive movement of the spreader-sprayer 10. In some forms, the spreader-sprayer 10 can include a zero-turn steering assembly with drive wheels 16a rotating independently of one another and caster wheels 16b. To turn, the drive wheels 16a can rotate at different speeds with respect to one another. For example, one of the drive wheels 16a can be stationary, and/or the drive wheels 16a can rotate in opposite directions with respect to one another. The spreader-sprayer 10 can alternatively include differential steering such that left and right drive wheels 16a do not spin at the same speed while the spreader-sprayer 10 is turned, allowing for a tight turn radius. In another form, the drive wheels 16a can be operably coupled together to rotate at the same speed, such as through a common axle.

In some versions, the spreader-sprayer 10 can be a standing vehicle with a rear standing platform 20 and a rearwardly-facing control panel 22 accessible from the standing platform 20. This arrangement provides user control of the various components of the spreader-sprayer 10. For example, the control panel 22 can include associated drive control handles 24 to control drive and reverse settings, as well as turning operations for the spreader-sprayer 10. Other handling controls are possible for the various drive wheel configurations discussed above, including steering wheels and the like. Sitting configurations are also possible for the rideable equipment.

Figure 2:
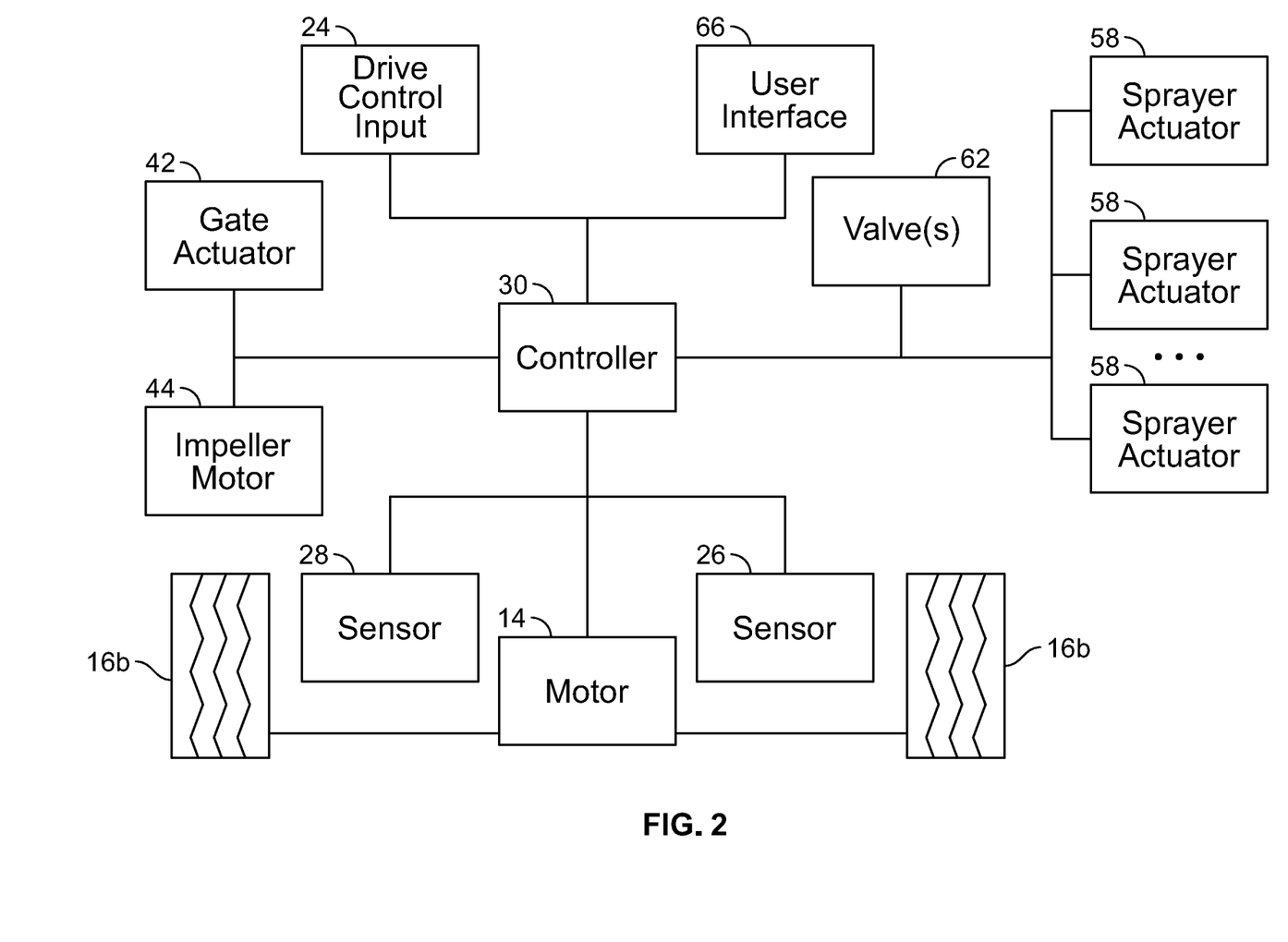
FIG. 2 is a diagrammatic view of a control system for the fertilizer distribution equipment of FIG. 1 in accordance with various embodiments.

As shown in FIG. 2, the spreader-sprayer 10 further includes left and right sensors 26, 28 operably coupled to or disposed adjacent to left and right steerable or drive wheels 16, respectively. The sensors 26, 28 are configured to determine the revolutions per minute (rpm) for each of the left and right wheels 16 to track the speed of the spreader-sprayer 10. Further, with this configuration, when an operator turns the spreader-sprayer 10, an inside one of the wheels 16 will have a slower rpm relative to the outside one of the wheels 16. If desired, the sensors 26, 28 can also be configured to monitor the rotational direction of the wheels 16b to thereby determine if the wheels 16b are being driven in opposite directions to one another. In other versions, such as with drive wheels 16 that rotate at the same speed, a single sensor can be utilized to measure rpm data. The data collected by the sensors 26, 28 while the spreader-sprayer 10 is operated can advantageously be utilized to efficiently dispense fertilizer as described in more detail below.

The sensors 26, 28 can measure the rpm by any suitable configuration. For example, the sensors 26, 28 can be infrared sensors, optical sensors, proximity sensors, Hall effect sensors, etc. Further, the wheels 16 can include corresponding components or structures configured to indicate rotational speed or provide feedback to the sensors 26, 28, such as a patterned layer or coating, patterned component distribution, openings or recesses, magnets, and so forth.

As shown in FIG. 2, the sensors 26, 28 can be communicatively connected to a controller 30 to provide rpm data feedback to the controller 30. For some uses, the controller 30 can be configured to average the rpm from the left and right wheels 16 to determine an average ground speed for the spreader-sprayer 10.

The controller 30 may include wired and/or wireless connections, circuitry for communications and signal processing, non-transient memory and/or a human-machine interface. In an example implementation, the controller 30 includes processing software such as a microprocessor and a computer-readable memory to store software instructions. Generally, the controller 30 may be configured to use the received speed data feedback to execute a control algorithm to control dispensing operations for the spreader-sprayer 10. In some implementations, the controller 30 may comprise one or more microprocessors. In other implementations, the controller 30 may comprise field programmable gate arrays (FPGAs) or analog circuits. The controller 30 may be configured to execute the control algorithm (e.g., a Multiple Input Multiple Output (MIMO) control algorithm) to output electrical control signals. The controller 30 may additionally be configured to compute other signals.

Figure 3:
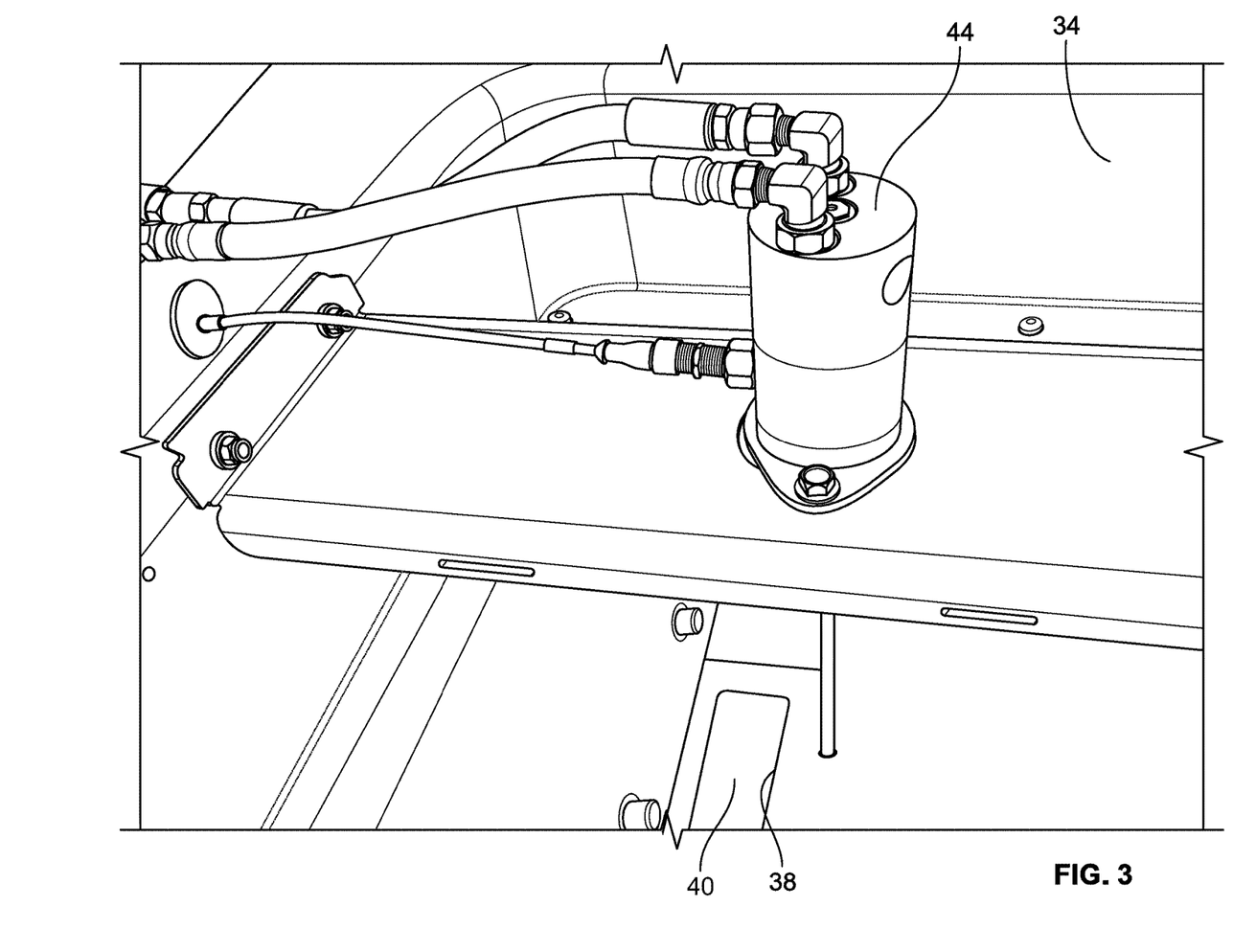
FIG. 3 is a perspective view of a hopper and outlet motor for the fertilizer distribution equipment of FIG. 1 in accordance with various embodiments.
Figure 4:
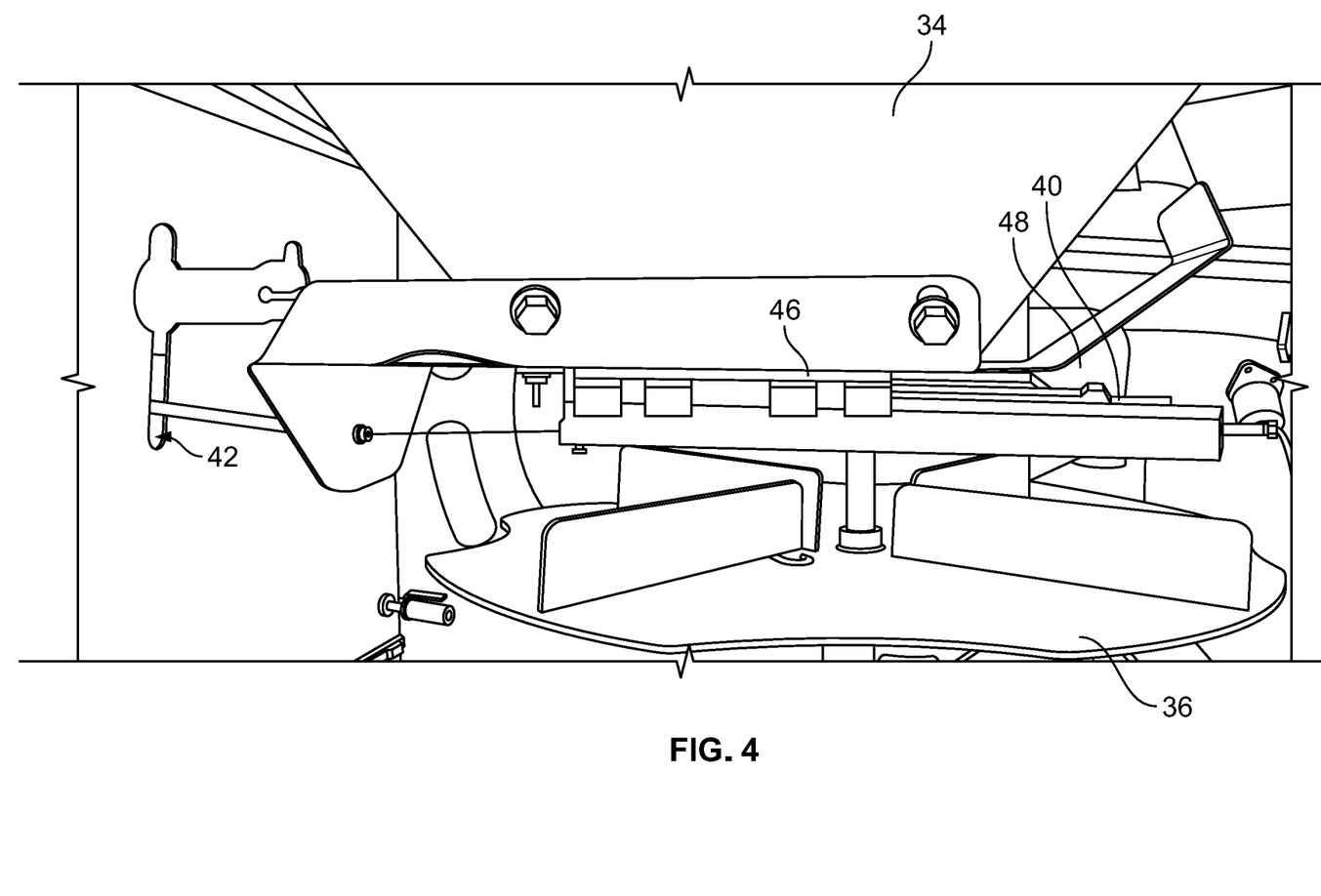
FIG. 4 is a side elevational view of a hopper outlet assembly and impeller for the fertilizer distribution equipment of FIG. 1 in accordance with various embodiments.

In one approach as shown in FIGS. 3 and 4, the spreader-sprayer 10 can be equipped to dispense a solid, flowable fertilizer product 32, including granular products. Pursuant to this, the spreader-sprayer 10 can include a hopper 34 and an impeller 36 disposed at or in communication with an outlet 38 of the hopper 34 to broadcast the solid product 32 in a generally half-circle pattern in front of the spreader-sprayer 10. The amount of solid product 32 dispensed from the hopper 34 can be controlled by opening and closing a gate 40 which increases and decreases the flow of the solid product 32 to the impeller 36. More specifically, movement of the gate 40 can be controlled by an actuator 42 operably coupled thereto. Rotation of the impeller 36 can be driven by a motor or other suitable drive 44. The rotational speed of the impeller 36 controls the size, e.g., diameter, of a dispensing area for the solid product 32. In one form, the motor 44 can be a hydraulic motor and an electric proportional valve or other suitable device or sensor can be used to monitor the rpm of the motor 44. The spreader-sprayer 10 can also include a diffuser 46 to control center-to-edge distribution of the solid product 32 through the outlet 38 and onto the impeller 36. A deflector shield 48 can be disposed adjacent to the impeller 36 to maximize deflection of deflect solid product 32 to more desirable broadcast areas. The deflector shield 48 can be selectively raised and lowered to block left and right distribution of the solid product 32. Additionally, although the impeller 36 is shown, other flowable product dispensing mechanisms and structures are possible.

Operation of the actuator 42 and/or impeller motor 44 can be controlled by the controller 30 and based, at least in part, on the rpm data from the sensors 26, 28, with the controller 30 receiving feedback from the devices 26, 28, 42, 44. Accordingly, the controller 30 can increase the amount of solid product 32 dispensed when the ground speed of the spreader-sprayer 10 is increased, and the controller 30 can decrease the amount of solid product 32 dispensed when the speed of the spreader-sprayer 10 is decreased. By monitoring the ground speed of the spreader-sprayer 10 constantly, the controller 30 can dynamically control the outlet size of the hopper 34. Additionally, the rotational speed of the impeller 36 can be controlled by the controller 30, which monitors the rpm of the motor 44 to increase or decrease the broadcast diameter based on the ground speed of the spreader-sprayer 10. For example, the controller 30 can increase the speed of the impeller 36 and therefore increase the broadcast diameter for the fertilizer product 32 in response to increased ground speed of the spreader-sprayer 10. Conversely, the controller 30 can decrease the impeller's speed in response to the ground speed of the spreader-sprayer 10 decreasing.

The controller 30 can also be configured to control dispensing of the solid product 32 when the spreader-sprayer 10 is turned or changes direction. For example, the controller 30 can cause the actuator 42 to decrease the size the outlet 38 by movement of the gate 40 in response to the sensors 26, 28 indicating that one of the wheels 16 is revolving slower than the other or turning in an opposite direction, i.e., the spreader-sprayer 10 is turning. Further, during the turning operation, the controller 30 can decrease the rotational speed of the impeller 36 to decrease a broadcast width of the solid product 32.

In other versions, the diffuser 46 and/or deflector shield 48 can be controlled by the controller 30 and based, at least in part, on the rpm data from the sensors 26, 28. More specifically, the controller 30 can operate the diffuser 46 to control the flow of the solid product 32 so that the impeller 36 broadcasts the solid product 32 away from the direction of the turn. In other words, the position of the edge of the impeller 36 can be adjusted for the spread pattern to be heavier to the left, or the impeller's center can be adjusted for the spread pattern to be heavier to the right. In addition or alternatively, the position of the deflector shield 48 adjacent to the impeller 36 can be moved in the direction of the turn in response to an operator turning the spreader-sprayer 10.

Figure 1:
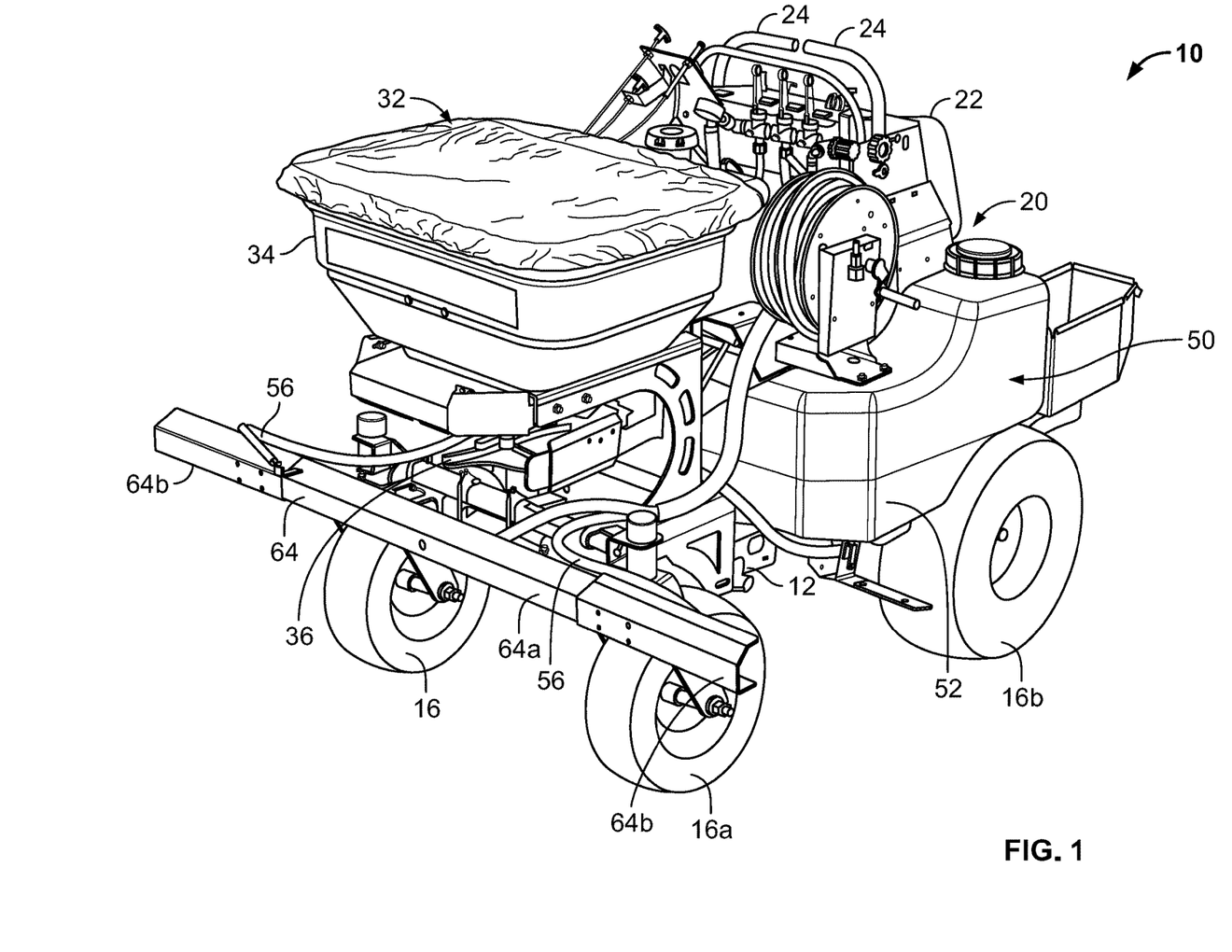
FIG. 1 is a perspective view of fertilizer distribution equipment in accordance with various embodiments.
Figure 5:
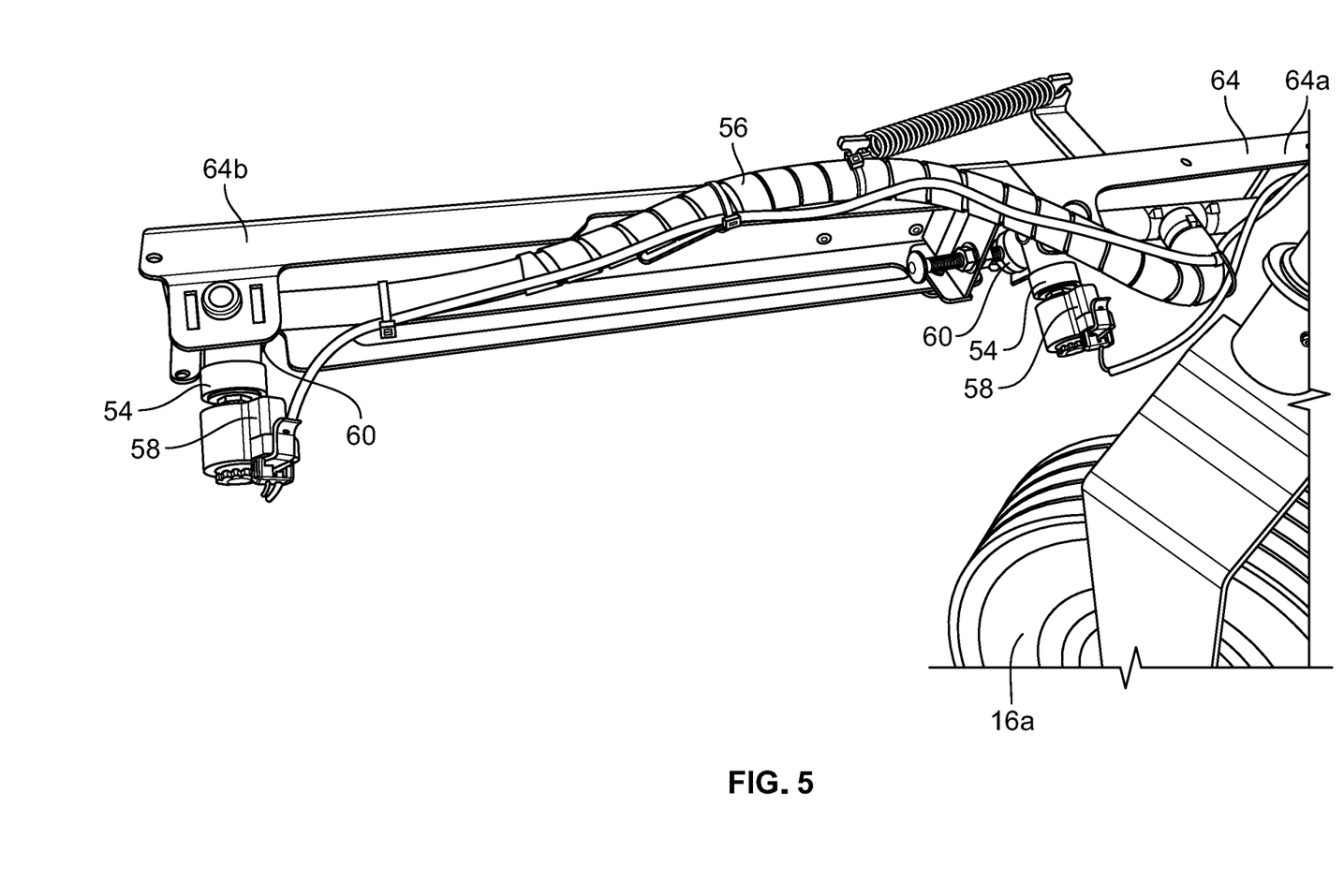
FIG. 5 is a perspective view of a boom having a plurality of sprayer assemblies mounted thereto for the fertilizer distribution equipment of FIG. 1 in accordance with various embodiments.

In a further approach as shown in FIGS. 1 and 5, the spreader-sprayer 10 can alternatively or also be equipped to dispense a liquid fertilizer product 50. The liquid product 50 can be stored in one or more tanks 52 and supplied to one or more sprayers 54 through flow paths 56, which can include any suitable conduits, valves, couplings, and so forth. For example, the flow paths 56 can include a throttle valve to pressurize the lines or a pump so that the liquid product 50 can be dispensed through the sprayers 54.

In some versions, each sprayer 54 can include an electric actuator 58 operably coupled to an outlet 60 of the sprayer 54 to cause the sprayer 54 to provide a pulsed output of the liquid product 50. In one form, the outlet 60 can be an air injection tip. Each sprayer 54 can also include a flow control or pressure regulating valve 62 that pressurizes the liquid product 50 to maintain a desired spray pressure through the sprayer outlet 60. The pressure regulating valve 62 can be electronic and operable in response to signals received from the controller 30 or can be mechanical. With this configuration, the actuator 58 can vary a pulse frequency of the liquid product 50 through the sprayer 54 and therefore can regulate the amount of liquid product 50 being dispensed. In one example, each of the sprayers 54 can have a spray profile of about 24 inches, such that in the illustrated form, the spreader-sprayer 10 can cover a path that is about eight feet wide.

As with the above forms, operation of the actuator 58 can be controlled by the controller 30 and based, at least in part, on the rpm data from the sensors 26, 28. Accordingly, the controller 30 can increase the amount of liquid product 50 dispensed when the ground speed of the spreader-sprayer 10 is increased and decrease the amount of liquid product 50 dispensed when the ground speed of the spreader-sprayer 10 is decreased. Further, the controller 30 can advantageously take the rpm data for the individual wheels 16 to regulate the amount of liquid product 38 dispensed when the operator turns the spreader-sprayer 10. For example, in the illustrated form, the spreader-sprayer 10 includes a boom 64 with a central portion 64a having three sprayers 54 distributed thereacross and outer portions 64b each having sprayer 54 mounted thereto. Of course, other numbers and distributions of sprayers 54 are possible. Each sprayer 54 can be individually regulated by the controller 30 so that the innermost sprayer 54 in the direction of the turn has the lowest amount of overall flow of the liquid product 50 due to the relatively shorter travel distance and coverage area and the outermost sprayer 54 has the highest amount of overall flow of the liquid product 50 due to the relatively longer travel distance and associated coverage area. Any intermediate sprayers 54 between the innermost and outermost sprayer 54 can be regulated in a similar manner with the regulated flow increasing as the individual sprayer 54 is located at a greater distance from a center point of the turn. With this configuration, the generally half-circle or dome-shaped area covered by the spreader-sprayer 10 during a turn can allow the fertilizer distribution to be generally uniform.

Figure 6:
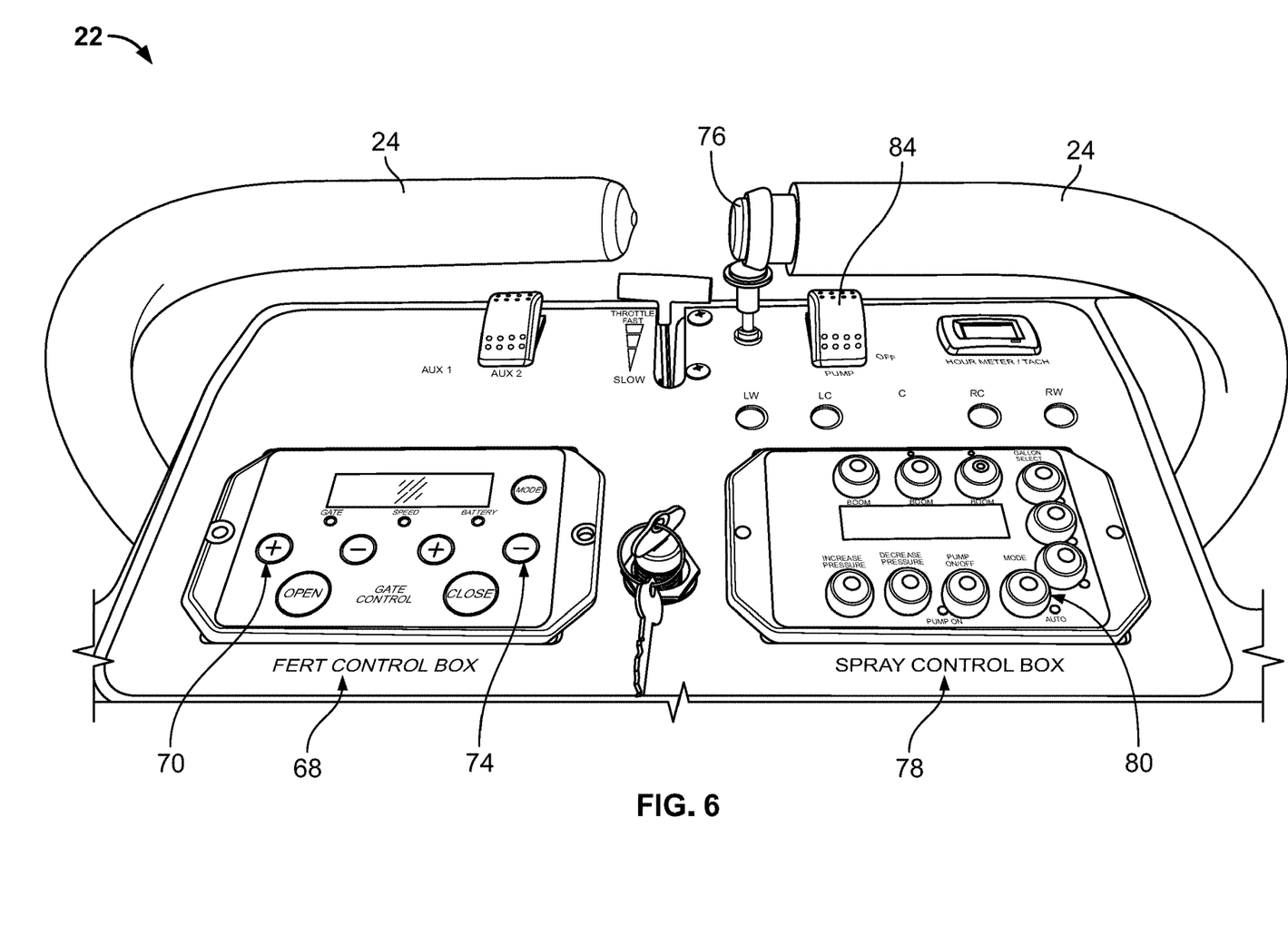
FIG. 6 is a perspective view of a control panel for the fertilizer distribution equipment of FIG. 1 in accordance with various embodiments.

An example user interface 66 for the control panel 22 is shown in FIG. 6. In order to provide instructions for the controller 30 to regulate the output of the solid product 32 through the gate 40 to be broadcast by the impeller 36, the user interface 66 can include solid product settings 68. As shown, the solid product settings 68 can include a weight-per-area input 70, which allows the controller 30 to regulate the flow of solid product 32 through the outlet 38. If desired, the solid product settings 68 can have a default distribution area, such as a square footage based on dimensions or operational capacity of the spreader-sprayer 10, or can include an area input to enter a desired area for each unit of weight of the material being distributed. The solid product settings 68 can further include a width input 74 through which the controller 30 can regulate operation of the motor 44 to regulate the impeller's rotation speed. In some versions, the solid product settings 68 can also include an on/off switch or button 76 to cause the controller 30 to stop distribution of the solid product 32 while the spreader-sprayer 10 is operating. The on/off switch 76 can be a toggle with distinct on and off positions or can have a single actuation mechanism to switch between on and off states. Additionally, the on/off switch 76 can be provided on the handle 24, such as in a distal end thereof as shown, on the user interface 66, as a foot operated mechanism on the platform 20, and so forth, Additionally, the solid product settings 68 can include a manual mode to bypass the metering functionality based on the rpm data from the sensors 26, 28. In one example, the weight-per-area input can be about one pound of solid product 32 for about 1000 square feet of area.

In order to provide instructions for the controller 30 to regulate the output of the liquid product 50 through the sprayers 54, the user interface 66 can also or alternatively include liquid product settings 78. As shown, the liquid product settings 78 can include a volume-per-area input 80 with which the controller 30 can regulate the flow of liquid product 50 through the outlet 60 (FIG. 5). If desired, the liquid product settings 78 can have a default distribution area, such as a square footage based on dimensions or operational capacity of the spreader-sprayer 10, or can include an area input to enter a desired area for each unit of volume. In some versions, the liquid product settings 78 can also include an on/off switch or button 84 to cause the controller 30 to stop distribution of the liquid product 50 while the spreader-sprayer 10 is operating. The on/off switch 84 can be a toggle with distinct on and off positions or can have a single actuation mechanism to switch between on and off states. Additionally, the on/off switch 84 can be provided on the user interface 66 as shown, on the handle 24, as a foot operated mechanism on the platform 20, and so forth, Additionally, the liquid product settings 78 can include a manual mode to bypass the metering functionality based on the rpm data from the sensors 26, 28. In one example, the volume-per-area input can be about one gallon of liquid product 50 for about 1000 square feet of area.

If desired, the controller 30 can be configured to only dispense solid and/or liquid product 32, 50 when the spreader-sprayer 10 is moving in a forward direction. With this configuration, no fertilizer product 32, 50 is dispensed when the spreader-sprayer 10 is stationary or in reverse. In some versions, the spreader-sprayer 10 can be operated at speeds of up to 7 mph.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples without departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. Fertilizer distribution equipment comprising:
   a chassis;
   a motor carried by the chassis;
   wheels operably coupled to the motor to be driven thereby to thereby drive movement of the chassis, the wheels including opposing left and right wheels;
   left and right sensors operably coupled to the left and right wheels respectively, the left and right sensors being configured to measure revolution data of the left and right wheels;
   a hopper carried by the chassis and having an outlet, the hopper configured to receive a solid, flowable fertilizer product therein;
   a gate movable to extend across the outlet of the hopper to restrict and stop flow of solid, flowable fertilizer product therethrough;
   an actuator coupled to the gate;
   a user input configured to receive a weight-per-area input for the distribution of the solid, flowable fertilizer; and
   a controller in communication with the left and right sensors to receive the revolution data therefrom and the user input to receive the weight-per-area input therefrom; and wherein the controller is operably coupled to the actuator to control operation thereof to shift the gate with respect to the outlet opening of the hopper based at least in part on the revolution data and the weight-per-area input.

2. The fertilizer distribution equipment of claim 1, wherein the left and right wheels are independently steerable; and wherein the controller is configured to average the revolution data from the left and right sensors to determine a ground speed estimate.

3. The fertilizer distribution equipment of claim 2, further comprising:
   an impeller mounted adjacent to the outlet of the hopper; and
   a motor operably coupled to the impeller to drive rotation thereof; and
   wherein the controller is operably coupled to the motor to control operation thereof to regulate a rotational speed of the impeller.

4. The fertilizer distribution equipment of claim 2, further comprising:
   one or more tanks carried by the chassis and configured to contain a liquid fertilizer product;
   a plurality of sprayers;
   flowpaths fluidly coupling the one or more tanks with the plurality of sprayers; and
   a plurality of sprayer actuators, each operably coupled to one of the plurality of sprayers, the plurality of sprayer actuators configured to regulate outlets of the plurality of sprayers;
   wherein the user input is further configured to receive a volume-per-area input for the distribution of the liquid fertilizer; and the controller is operably coupled to the plurality of actuators to control operation thereof and, in response to determining that the revolution data from the left and right sensors indicate a turn and based at least in part on the ground speed estimate and the volume-per-area input, is configured to selectively control operation of the plurality of actuators such that flow of the liquid fertilizer product through the plurality of sprayers increases from an innermost sprayer of the plurality of sprayers in the direction of the turn to an outermost sprayer of the plurality of sprayers.

5. The fertilizer distribution equipment of claim 1, further comprising:
   one or more tanks carried by the chassis and configured to contain a liquid fertilizer product;
   a plurality of sprayers;
   flowpaths fluidly coupling the one or more tanks with the plurality of sprayers; and
   a plurality of sprayer actuators, each operably coupled to one of the plurality of sprayers, the plurality of sprayer actuators configured to regulate outlets of the plurality of sprayers;
   wherein the user input is further configured to receive a volume-per-area input for the distribution of the liquid fertilizer; and the controller is operably coupled to the plurality of sprayer actuators to control operation thereof to regulate the flow of the liquid fertilizer through the plurality of sprayers based at least in part on the revolution data and the volume-per-area input.

6. The fertilizer distribution equipment of claim 1, wherein the user input further comprises an on/off button; and the controller is configured to control operation of the actuator to shift the gate to cover the outlet opening of the hopper in response to actuation of the on/off button.

7. Fertilizer distribution equipment comprising:
   a chassis;
   a motor carried by the chassis;
   wheels operably coupled to the motor to be driven thereby to thereby drive movement of the chassis, the wheels including opposing left and right wheels;

left and right sensors operably coupled to the left and right wheels respectively, the left and right sensors being configured to measure revolution data of the left and right wheels;

one or more tanks carried by the chassis and configured to contain a liquid fertilizer product;

a plurality of sprayers;

flowpaths fluidly coupling the one or more tanks with the plurality of sprayers;

a plurality of actuators, each operably coupled to one of the plurality of sprayers, the plurality of sprayer actuators configured to regulate outlets of the plurality of sprayers; and a user input configured to receive a volume-per-area input for the distribution of the liquid fertilizer; and a controller in communication with the left and right sensors to receive the revolution data therefrom and the user input to receive the volume-per-area input therefrom; and wherein the controller is configured to determine whether the revolution data from the left and right sensors indicate that the fertilizer distribution equipment is turning; and is operably coupled to the plurality of sprayer actuators to control operation thereof to regulate the flow of the liquid fertilizer through the plurality of sprayers based at least in part on the revolution data and the volume-per-area input.

8. The fertilizer distribution equipment of claim 7, wherein, in response to determining that the revolution data from the left and right sensors indicate a turn, the controller is configured to selectively control operation of the plurality of sprayer actuators such that flow of the liquid fertilizer product through the plurality of sprayers increases from an innermost sprayer of the plurality of sprayers in the direction of the turn to an outermost sprayer of the plurality of sprayers.

9. The fertilizer distribution equipment of claim 7, wherein the left and right wheels are independently steerable; and wherein the controller is configured to average the revolution data from the left and right sensors to determine a ground speed estimate.

10. The fertilizer distribution equipment of claim 9, further comprising:

a hopper carried by the chassis and having an outlet, the hopper configured to receive a solid, flowable fertilizer product therein;

a gate movable to extend across the outlet of the hopper to restrict and stop flow of solid, flowable fertilizer product therethrough;

an actuator coupled to the gate;

wherein the user input is further configured to receive a weight-per-area input for the distribution of the solid, flowable fertilizer; and the controller is configured to receive the weight-per-area input; and is operably coupled to the actuator to control operation thereof to shift the gate with respect to the outlet opening of the hopper based at least in part on the ground speed estimate and the weight-per-area input.

11. The fertilizer distribution equipment of claim 10, further comprising:

an impeller mounted adjacent to the outlet of the hopper; and a motor operably coupled to the impeller to drive rotation thereof; and wherein the controller is operably coupled to the motor to control operation thereof to regulate a rotational speed of the impeller.

12. The fertilizer distribution equipment of claim 7, wherein the user input further comprises an on/off button; and the controller is configured to control operation of the plurality of sprayer actuators to stop the flow of the liquid fertilizer product through the plurality of sprayers in response to actuation of the on/off button.

13. A method of distributing fertilizer using fertilizer distribution equipment, the method comprising:

receiving a unit-per-area input from a user input for the distribution of a fertilizer product at a controller;

receiving revolution data from left and right sensors coupled to opposing left and right wheels of the fertilizer distribution equipment at the controller, the left and right wheels being independently steerable;

averaging the revolution data from the left and right sensors to estimate a ground speed for the fertilizer distribution equipment; and controlling the operation of an actuator operably coupled to an outlet with the controller to regulate output of the fertilizer product therethrough based at least in part on the ground speed and the unit-per-area input.

14. The method of claim 13, wherein the fertilizer product comprises a solid, flowable fertilizer product; the fertilizer distribution equipment includes a hopper with an outlet that is configured to receive the solid, flowable fertilizer product therein and a gate movable to extend across the outlet of the hopper to restrict and stop flow of the solid, flowable fertilizer product therethrough; the actuator is coupled to the gate; the unit-per-area input comprises a weight-per-area input; and controlling the operation of the actuator comprises controlling the operation of the actuator to shift the gate with respect to the outlet opening of the hopper based at least in part on the ground speed and the weight-per-area input.

15. The method of claim 14, further comprising controlling the operation of a motor operably coupled to an impeller mounted adjacent to the outlet of the hopper with the controller to regulate a rotational speed of the impeller.

16. The method of claim 13, wherein the fertilizer product comprises a liquid fertilizer product; the fertilizer distribution equipment includes one or more tanks configured to contain the liquid fertilizer product and a plurality of sprayers, flowpaths fluidly coupling the one or more tanks with the plurality of sprayers; the actuator comprises a plurality of sprayer actuators operably coupled to one of the plurality of sprayers and configured to regulate outlets of the plurality of sprayers, the unit-per-area input comprises a volume-per-area input; and controlling the operation of the actuator comprises controlling the operation of the plurality of sprayer actuators to regulate the flow of the liquid fertilizer through the plurality of sprayers based at least in part on the ground speed and the volume-per-area input.

17. The method of claim 13, further comprising determining that the revolution data indicates a turn for the fertilizer distribution equipment; and wherein controlling the operation of the actuator further comprises controlling the operation of the actuator to regulate output of the fertilizer product to compensate for the turn.

18. The method of claim 17, wherein the fertilizer product comprises a liquid fertilizer product; the fertilizer distribution equipment includes one or more tanks configured to contain the liquid fertilizer product and a plurality of sprayers, flowpaths fluidly coupling the one or more tanks with the plurality of sprayers; the actuator comprises a plurality of sprayer actuators operably coupled to one of the plurality of sprayers and configured to regulate outlets of the plurality of sprayers, the unit-per-area input comprises a volume-perarea input; and controlling the operation of the actuator comprises, in response to determining that the revolution data indicates a turn and based at least in part on the ground speed and the volume-per-area input, selectively controlling operation of the plurality of actuators such that flow of the liquid fertilizer product through the plurality of sprayers increases from an innermost sprayer of the plurality of sprayers in the direction of the turn to an outermost sprayer of the plurality of sprayers.

19. The method of claim 13, further comprising:
  receiving an actuation signal of an on/off button; and
  controlling operation of the actuator to stop output of the fertilizer product through the outlet.

\* \* \* \* \*